US006479588B1

(12) United States Patent
Lu et al.

(10) Patent No.: US 6,479,588 B1
(45) Date of Patent: Nov. 12, 2002

(54) GRAFT COPOLYMER OF POLYAMIDE AND A GLYCIDYL GROUP-CONTAINING ACRYLATE COPOLYMER, PROCESS FOR PREPARATION AND COATING COMPOSITION CONTAINING THE GRAFT COPOLYMER

(75) Inventors: Szu-Ping Lu, Canton, MI (US); Paul J. Prucnal, Pittsburgh, PA (US); Hiram A. Norton, Grants Pass, OR (US)

(73) Assignee: Anderson Development Co., Adrian, MI (US)

( * ) Notice: Subject to any disclaimer, the term of this patent is extended or adjusted under 35 U.S.C. 154(b) by 0 days.

(21) Appl. No.: 09/641,760

(22) Filed: Aug. 21, 2000

Related U.S. Application Data

(60) Provisional application No. 60/149,913, filed on Aug. 23, 1999.

(51) Int. Cl.[7] .................................................. C08F 8/00
(52) U.S. Cl. ..................... 525/181; 525/63; 525/426; 525/430; 525/434; 525/449
(58) Field of Search ..................... 525/181, 63, 426, 525/430, 434, 449

(56) References Cited

U.S. PATENT DOCUMENTS

| | | |
|---|---|---|
| 4,378,448 A | 3/1983 | Park et al. |
| RE32,261 E | 10/1986 | Hirota et al. |
| 4,973,617 A | 11/1990 | Incontro et al. |
| 5,179,164 A * | 1/1993 | Lausberg et al. ............ 525/179 |
| 5,407,706 A | 4/1995 | Kano et al. |
| 5,436,311 A | 7/1995 | Hoebeke et al. |
| 5,543,489 A * | 8/1996 | Alex et al. ................... 528/288 |
| 5,574,101 A | 11/1996 | Kawakami et al. |
| 5,744,522 A | 4/1998 | Prucnal et al. |
| 5,866,673 A | 2/1999 | Mueller et al. |
| 6,012,991 A * | 1/2000 | Kim et al. ................... 473/374 |
| 6,025,423 A * | 2/2000 | Breant ......................... 524/412 |

FOREIGN PATENT DOCUMENTS

JP            2060930      3/1990

OTHER PUBLICATIONS

NERAC Search Report, Relating to Nylon Modified Acrylics and Certain Technical Literature, 1998.
Elf Atochem, PEBAX , 33 Series Property Comparison, May 1994.
J. Flesher, Jr., "Polyether block amide: high performance TPE ", Modern Plastics, Sep. 1987.
Elf Atochem, PEBAX , Polyether Block Amides.

* cited by examiner

*Primary Examiner*—James J. Seidleck
*Assistant Examiner*—Melanie Bissett
(74) *Attorney, Agent, or Firm*—Burns Doane Swecker & Mathis LLP

(57) ABSTRACT

A graft copolymer comprising a polyamide to which is grafted a glycidyl group-containing acrylate copolymer. The graft copolymer can be prepared by dispersing in an organic solvent a polyamide and a material which will react with the polyamide to form the graft copolymer of the polyamide and the acrylate copolymer and reacting the polyamide and the material so as to form said graft copolymer. The graft copolymer can exhibit improved toughness and reduced friability and can be used to form molded articles and in coating compositions, especially powder coating compositions. The coatings can exhibit transparency, reduced brittleness and increased chip resistance. The powder coatings can further exhibit high gloss and smoothness due to superior flow characteristics thereby enabling thinner coatings to be used that provide acceptable appearance.

40 Claims, No Drawings

GRAFT COPOLYMER OF POLYAMIDE AND A GLYCIDYL GROUP-CONTAINING ACRYLATE COPOLYMER, PROCESS FOR PREPARATION AND COATING COMPOSITION CONTAINING THE GRAFT COPOLYMER

This application claims priority under 35 U.S.C. §§119 and/or 365 to Provisional Application No. 60/149,913 filed in the United States on Aug. 23, 1999; the entire content of which is hereby incorporated by reference.

BACKGROUND OF THE INVENTION

A. Field of the Invention

The present invention relates to a graft copolymer of polyamide and a glycidyl group-containing acrylate copolymer and a process for preparing the graft copolymer. The present invention further relates to a coating composition containing the graft copolymer, particularly a powder coating composition.

B. Description of the Related Art

Over the years, society has greatly benefitted from the development of a wide spectrum of polymeric materials. Polymers have been used in almost every phase of everyday life and have found particular applicability in automotive parts, containers, fibers, filaments, fabric, construction materials, adhesives and coatings. Due to the diverse characteristics of different polymers, some polymers are especially useful in certain environments while others are contraindicated. In an effort to alleviate the less advantageous properties of polymers, attempts have been made to modify polymers by blending additives or even other polymers. In addition, attempts have been made to chemically modify polymers by adding reactive groups, by copolymerization with compatible monomers, by block copolymerization or by graft copolymerization.

In the field of coatings, particularly powdered coatings, polymeric materials have played a prominent role. For instance, U.S. Pat. No. 4,042,645, reissued as Reissue Pat. No. 32,261, describes a thermosetting powder coating composition obtained by mixing a major proportion of a solid copolymer prepared from defined amounts of (A) a (meth) acrylate ester, (B) an α,β-ethylenically unsaturated carboxylic acid or anhydride or a glycidyl acrylate or methacrylate, optionally (C) a monomer copolymerizable with (A) and (B), and a minor portion of a cross-linking compound or an epoxy resin containing at least two epoxy radicals in the molecule in the presence of a tertiary amine curing accelerator.

To modify the properties of the powder coatings, blends with additives or other polymers have typically been employed. However, one of the drawbacks of blends is that a hazy or opaque coating often is obtained. While such a result might be acceptable if the coating is to be pigmented, it is unacceptable if the haze or opacity adversely affects the aesthetics of the coating or if a clear coat is desired.

Further illustrative of the art relating to powder coatings is U.S. Pat. No. 5,407,706 which describes a powder coating composition that provides low gloss upon curing. The composition comprises (A) a resin comprising from 10 to 90 weight % of an acrylic resin having a viscosity of 100 to 800 poises at 140° C. that is obtained by polymerizing 10 to 50 weight % of glycidyl acrylate or glycidyl methacrylate with 90 to 50 weight % of a copolymerizable monomer and 90 to 10 weight % of a further acrylic resin having a viscosity of 1,000 to 5,000 poises at 140° C. that is prepared from defined comonomers, and (B) a polybasic acid compound having a viscosity of 100 to 2,000 poises at 150° C. The equivalent ratio of the glycidyl groups to the acid groups of the polybasic acid compound may be from 1.5 to 0.5.

U.S. Pat. No. 5,436,311 describes a powder thermosetting composition comprising as binder a mixture of a linear carboxyl group-containing polyester and a glycidyl group containing acrylic copolymer. The polyester has an acid number of 20 to 50 mg KOH/g. The acrylic copolymer has a number average molecular weight of from 4,000 to 10,000 and is obtained from 5 to 30% by weight glycidyl acrylate or glycidyl methacrylate and 70 to 95% by weight of methyl methacrylate whereby up to 25% by weight of the methyl methacrylate can be replaced by another vinyl monomer.

U.S. Pat. No. 5,744,522 relates to a low gloss coating composition containing a glycidyl group-containing acrylic copolymer, an aromatic polyester and a defined isocyanurate curing agent. The background of this patent provides a description of the previously described patents and other documents relating to coating compositions.

In addition to various acrylic polymers, the art has developed certain modified polyamides. Illustrative of such modified polyamides is U.S. Pat. No. 4,973,617 which relates to a water-borne printing ink composition based on acrylic resins and maleated rosin modified polyamides. The modified polyamides are said to provide good adhesion, clean printing, excellent film wetting and superior resolubility and the resulting ink compositions are said to be especially useful for printing onto plastic substrates.

U.S. Pat. No. 5,574,101 describes an acrylic resin composition comprising at least one polyamide elastomer consisting of hard segments and soft segments, an acrylic resin and optionally at least one electrolyte. The composition is said to possess permanent anti-static properties and good transparency which is only slightly deteriorated even when immersed in water. The compositions are disclosed as being useful for parts of electronic products, household appliances, office automation appliances and other devices.

Japanese Unexamined Patent Publication No. 02-060930 relates to graft copolymers which are said to exhibit transparency, flexibility and heat resistance which are useful for the preparation of coatings, adhesives, etc. The graft copolymers are prepared by polycondensing a polyalkyl (meth)acrylate, such as polybutyl acrylate, a dicarboxylic acid and an aromatic diamine.

BRIEF SUMMARY OF THE INVENTION

In one aspect, the present invention provides a graft copolymer comprising a polyamide to which is grafted a glycidyl group-containing acrylate copolymer.

In a further aspect, the present invention provides a process for preparing a graft copolymer comprising a polyamide to which is grafted a glycidyl group-containing acrylate copolymer. The process comprises:

A) dispersing in an organic solvent a polyamide and a material which will react with the polyamide to form the graft copolymer of the polyamide and the glycidyl group-containing acrylate copolymer; and B) reacting the polyamide and the material so as to form said graft copolymer.

In a still further aspect, the present invention provides coating compositions comprised of the graft copolymer.

DETAILED DESCRIPTION OF THE INVENTION

As noted above, one aspect of the present invention relates to a graft copolymer comprising a polyamide to which is grafted a glycidyl group-containing acrylate copolymer. The polyamide preferably exhibits a relatively low melting point which is less than about 160° C., more preferably less than about 145° C., as determined by a differential scanning calorimeter and ASTM B3418. Polyamides of this type generally have a weight average molecular weight greater than about 100,000 as determined by gel permeation chromatography.

Polyamides which can be used in the present invention are known in the art. For instance, one type of polyamide which can be used is a block copolymer prepared from nylon 12 (polydodecanolactam) and polytetramethylene ether glycol. Such polyamide is commercially available from Elf Atochem under the designations Pebax 2533, 3533 and 5533.

The glycidyl group-containing acrylate copolymer can be grafted to the polyamide in a process which involves sufficiently dispersing the polyamide in an organic solvent selected so that the polyamide can be reacted to form the graft copolymer. The organic solvent is typically a non-polar aromatic solvent such as xylene, toluene or commercially available proprietary solvents, such as Aromatic 100, or mixtures thereof and is preferably selected so that the polyamide can be totally dispersed (i.e., dissolved) in the solvent. The preferred organic solvent is xylene. Although not critical, the polyamide is dispersed in an amount ranging from about 2 to about 25% by weight of the organic solvent.

The material which forms the graft copolymer with the polyamide can be added with the polyamide into the organic solvent, but is preferably added after the polyamide has been dispersed. As used in the present invention, the term "material" means a component or plurality of components that can react with the polyamide to form the graft copolymer of the polyamide and the glycidyl group-containing acrylate copolymer. More specifically, the material can be an unpolymerized mixture of ethylenically unsaturated monomers and initiator or a preformed polymer solution containing the initiator. The mixture of monomers comprises at least one compound of formula (I) and at least one ethylenically unsaturated compound that is copolymerizable with the monomer(s) of formula (I). Formula (I) is set forth as follows:

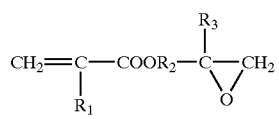

wherein $R_1$ represents H or an alkyl group containing from 1 to 4 carbon atoms, $R_2$ represents a branched or unbranched alkyl group containing from 1 to 20 carbon atoms, and $R_3$ represents H or an alkyl group containing from 1 to 4 carbon atoms. Illustrative compounds within the definition of formula (I) are glycidyl acrylate, glycidylmethacrylate, 1,2-epoxybutylacrylate and betamethyl glycidyl methacrylate. Glycidyl methacrylate is the preferred compound of formula (I).

The compound of formula (I) generally is present in amount of from about 10 to about 70%, preferably from about 16 to about 50% by weight of the precursors forming the glycidyl group-containing acrylate copolymer.

The ethylenically unsaturated compound copolymerizable with the compound of formula (I) can include alkyl esters of acrylic acid or methacrylic acid such as methyl acrylate, ethyl acrylate, n-butyl acrylate, isobutyl acrylate, 2-ethylhexyl acrylate, cyclohexyl acrylate, isobornylacrylate, methyl methacrylate, ethyl methacrylate, n-butyl methacrylate, isobutyl methacrylate, 2-ethylhexylmethacrylate, lauryl methacrylate, tridecyl methacrylate, stearyl methacrylate, cyclohexyl methacrylate, isobornyl methacrylate and mixtures thereof. Preferred alkyl esters of acrylic acid or methacrylic acid are methyl methacrylate and n-butyl methacrylate and especially preferred is a mixture of methyl methacrylate and n-butyl methacrylate.

The ethylenically unsaturated compound can further include vinyl monomers such as styrene, vinyltoluene, α-methylstyrene; acrylonitriles, for example, acrylonitrile and methacrylonitrile; acrylamides, for example, acrylamide and dimethylacrylamide; hydroxyalkyl esters of acrylic acid and methacrylic acid, for example, hydroxyethyl acrylate, hydroxypropyl acrylate, hydroxyethyl methacrylate, and hydroxypropyl methacrylate; and dialkyl esters of unsaturated dibasic acids. The ethylenically unsaturated compound copolymerizable with the compound of formula (I) can also be mixtures of the aforementioned compounds. Other components may be present as long as they do not substantially adversely affect the results of the invention. It is preferred that the ethylenically unsaturated compound includes a vinyl monomer with styrene being especially preferred. A preferred material is a mixture of styrene, methyl methacrylate and n-butyl methacrylate which is reacted with a compound of formula (I), especially glycidyl methacrylate, to form a glycidyl group-containing copolymer that is grafted to the polyamide.

Although monomers are typically used so as to form a glycidyl group-containing acrylate copolymer and the graft copolymer in the same reaction medium, it is possible that higher molecular weight entities (e.g., oligomers or polymers) can be used as long as such entities can form the graft copolymer of polyamide and glycidyl group-containing acrylate copolymer. Thus, for instance, it is possible to form the graft copolymer by dispersing the polyamide and a polymer previously formed from at least one compound of formula (I) and at least one ethylenically unsaturated compound copolymerizable with the compound of formula (I) and reacting the polyamide and the preformed glycidyl group-containing acrylate copolymer to form the graft copolymer.

The ethylenically unsaturated compound copolymerizable with the compound of formula (I) is generally present in amount of from about 30 to about 90%, preferably from about 50 to about 84% by weight of the components forming the glycidyl group-containing acrylate copolymer.

The amounts of the polyamide and the material which forms the graft copolymer with the polyamide are generally selected so that the graft copolymer is comprised of from about 2 to about 50% by weight, preferably from about 5 to about 20% by weight of the polyamide and from about 50 to about 98% by weight, preferably from about 80 to about 95% by weight of the glycidyl group-containing acrylate copolymer.

To the dispersion containing the polyamide and the material which forms the graft copolymer with the polyamide is typically added an initiator for the graft copolymerization reaction. An acceptable initiator is one that generates free radicals that are sufficiently energetic to abstract hydrogen atoms from the polyamide during the reaction. One such group of initiators is those compounds which can form methyl radicals either directly or by decomposition of the primary radical to a methyl radical. Illustrative of this type of initiator which can be used in the present invention are t-butyl peroctoate, t-butylperoxyacetate, di-t-butylperoxide and mixtures thereof. The initiator can be present in an amount of from about 1 to about 12% by weight of the material used to prepare the graft copolymer with the polyamide.

It is also possible to use combinations of initiators which can provide a desired degree of grafting. For instance, the previously described type of initiator can be mixed with one or more initiators that are not sufficiently energetic to abstract hydrogen atoms. One example of this type of initiator is di-t-amyl peroxide. Thus, by selecting combinations of initiators in a manner known in the art, one can modify the characteristics of the graft copolymer and thus the final coating with respect to characteristics such as chip resistance and impact resistance.

The dispersion containing the polyamide and the material which forms the graft copolymer with the polyamide can also include a chain transfer agent, such as n-dodecyl mercaptan, t-dodecylmercaptan and mixtures thereof, in an amount of from about 0.1 to about 10% by weight of the polyamide and material used to prepare the graft copolymer. Other materials that may also be present are conventional: additive, such as thermal stabilizers, in amounts that are conventional in the art. One unexpected advantage of the graft copolymers of the present invention is that they can provide superior flow control even though they can exhibit high melt viscosity.

The reaction between the polyamide and the material which forms the graft copolymer with the polyamide is typically conducted under an inert atmosphere, such as nitrogen, at an elevated pressure of from about 1 to about 50 psig. The reaction is generally conducted within the temperature range of from about 90 to about 160° C. for a time ranging from about 1 to about 10 hours. During the polymerization reaction, the dispersion is stirred. Upon completion of the acrylic polymerization, the graft copolymer of the polyamide and the glycidyl group-containing acrylate copolymer is typically recovered by stripping the organic solvent from the graft copolymer under an elevated temperature and reduced pressure in a manner known in the art.

While not being limited to any particular theory, it is believed that active site(s) on the polyamide (i.e., free radicals) initiate an acrylic polymerization or terminate a growing acrylic polymer chain thereby forming the graft copolymer. It is possible that the polyamide can have multiple bonds to the glycidyl group-containing copolymer. It is further possible that some of the bonds with the polyamide can form via reaction of the epoxy group of the glycidyl group-containing acrylate copolymer with the NH-groups of the polyamide.

Although it is believed that all the polyamide molecules are reacted with the glycidyl group-containing acrylate copolymer, not all the glycidyl group-containing acrylate copolymer is reacted with nylon. This is particularly the case where an unpolymerized mixture of monomers comprising at least one compound of formula (I) and at least one ethylenically unsaturated compound that is copolymerizable with the monomer(s) of formula (I) is used with the polyamide so as to form the graft copolymer. The mixture of the graft copolymer and the glycidyl group-containing acrylate copolymer resulting from the reaction can be used as is or can be subjected to conventional separation techniques in order to recover the graft copolymer. The separated graft copolymer can then be used as an additive to modify the characteristics of conventional coating materials, particularly acrylic coating materials.

The graft copolymer typically has a weight average molecular weight of greater than about 120,000 as determined by gel permeation chromatography relative to a polystyrene standard. Where a mixture of the graft copolymer and the glycidyl group-containing acrylate copolymer is obtained and the graft copolymer is not separated from the glycidyl group-containing acrylate copolymer, the weight average molecular weight exhibits a bimodal molecular weight distribution with one peak on the order of about 4,000 to 12,000 which indicates the glycidyl group-containing acrylate copolymer and a further peak on the order of about 80,000 to 120,000 (or greater) which indicates the graft copolymer.

The graft copolymer of the polyamide and the glycidyl group-containing acrylate copolymer has a high degree of optical transparency compared with blends of the polyamide and the glycidyl group-containing acrylate copolymer.

The graft copolymer of the present invention can be used to prepare a variety of materials including molded articles. One advantage of the graft copolymer in prepared molded articles is the substantial reduction in bubbles, such as caused by air entrapment, despite a rapid increase in viscosity upon cooling.

The graft copolymer of the present invention is particularly useful in coating compositions. The coating composition can contain the graft copolymer in a solution or dispersion of an organic solvent, but it is especially preferred to prepare a coating composition which contains the graft copolymer in the form of a powder. Other components of the coating composition can include a polyester which is present in an amount ranging from about 2 to about 25%, preferably from about 5 to about 15% by weight of the graft copolymer. A particularly suitable polyester for use with the graft copolymer of the present invention is a commercially available aliphatic polyester having an acid number of approximately 54–58, a hydroxyl number less than 3.0, a maximum APHA color of 50, a specific gravity at 25° C. of 1.162, a melting point (as determined by a differential scanning calorimeter) of approximately 100° C. and a melt viscosity of approximately 2400–2700 cps at 100° C. (as determined by an ICI Cone & Plate Viscometer).

In addition, the coating composition can contain curing agents, such as 1,12-dodecanedioic acid (e.g., available from E.I. Dupont de Nemours & Co., Inc.) and 1,3,4-butanetricarboxylic acid (e.g., available from Mitsubishi Chemicals Inc.), the amount of which is based on epoxy equivalent weight and the desired properties of the cured coating. The coating composition can further contain conventional additives, such as ultraviolet absorbers (e.g., Tinuvin 900 from Ciba Geigy Corp.), hindered amine light stabilizers (e.g., Tinuvin 144 from Ciba Geigy Corp.), volatile release agents, such as benzoin (e.g., Uraflow B from GCA Chemical Co. of Bradenton, Fla.), in amounts known in the art. While the graft copolymers exhibit improved flow characteristics which can obviate the need of a flow modifier, such a modifier, e.g., Modaflow Powder III (polyacrylate flow modifier from Monsanto Co.), can also be added. The coating composition can be used to provide a clear coat, but fillers and pigments can also be incorporated into the coating composition in known amounts as the situation warrants.

A powdered coating composition can be prepared by mixing the graft copolymer comprised of the polyamide and the glycidyl group-containing acrylate copolymer and the other components of the composition, extruding the mixture, grinding the mixture into the form of powder that can be used in conventional powder coating apparatus, such as powder exhibiting an average particle size of from about 10 to about 70 microns. A convenient way of obtaining powder of appropriate size is by sieving, such as by using powder that passes through a 140 or 170 mesh screen.

A specific illustration of the foregoing technique on a small scale is to use a Vitamixer blender of the Vitamix Corporation in Cleveland, Ohio to form the initial mixture of the graft copolymer and the other components of the coating composition. The mixed components are then placed in a heated extruder where the mixture is melt mixed and extruded, such as an APV Model 19 PC twin screw extruder with two individually adjustable heating zones with a variable rotation rate that can provide an extrudate in ribbon form from between a pair of chilled pinch rolls. The extruded composition is then crushed into powder form by any suitable means, such as a hammer mill (or a Vitamixer blender for small quantities) and powder passing through a 140 or 170 mesh sieve is collected. The powder can be packaged and used for coating various articles.

The advantages of toughness and reduced friability that can be attained with the graft copolymer of the present invention is particularly manifested in the preparation of a powdered coating composition. The improved toughness of the graft copolymer is demonstrated by increased grinding times relative to conventional polymeric powder coating compositions in order to obtain the desired particle size. However, despite the longer grinding times, the amount of fines is substantially reduced thereby illustrating the improved friability. Since much of the fines are typically removed by particle classifiers (e.g., particle sieves) and discarded, it can be understood that the reduced friability that can be obtained from the present invention can result in improved process efficiency while the improved toughness can provide improved impact resistance and chip resistance that are important factors for coating compositions, particularly in the automotive coating area.

To apply the coating composition to a surface, conventional techniques can be used so as to obtain a smooth, substantially uniform coating. For instance, when the coating is to be applied to conductive substrates, such as steel articles (which have typically been pre-treated with iron or zinc phosphate), electrostatic spraying can be used. Spraying equipment is commercially available from manufacturers such as GEMA Volstatic of Indianapolis, Ind. and The Nordson Corp. of Amherst, Ohio.

Curing is achieved by heating the coated surface for a time sufficient to cure the composition. Although the specific curing conditions depend on the precise constituents of the composition, including the presence or absence of a cure catalyst, typical cure conditions without the presence of a catalyst are from about 20 to about 30 minutes at about 160 to about 195° C. As an illustration, typical curing conditions for a cured coating of 3 mils (approx. 80 microns) is 30 minutes at about 165° C. In the presence of conventional cure catalysts, such as dimethylcocoamine, in amounts known in the art, cure temperatures can be as low as 135° C.

By following the teachings of the present invention, the cured composition can provide a smooth glossy finish that exhibits a brightness characteristic of high refractive index compositions. Unlike blends of the polyamide and the glycidyl group-containing acrylate copolymer which are cloudy or opaque, the graft copolymers can provide optical transparency which is vital in the preparation of clearcoat compositions. The smooth glossy finish that can be obtained in accordance with the present invention is especially surprising in view of the high melt viscosity that is exhibited by some of the graft copolymers. Less smoothness and lower gloss would normally be expected from materials exhibiting a higher melt viscosity. Therefore, it can be understood that the graft copolymers exhibit superior flow properties. This characteristic enables thinner powder coatings to be used to attain the same appearance comparable to liquid coatings. If one can use thinner powder coatings while obtaining the same surface appearance as thicker coatings made from conventional powder material, significant savings in material and an improvement in process efficiency can be attained. In addition, if a flow control agent can be reduced in amount or eliminated entirely, the gloss can be improved since a flow control agent typically concentrates on the surface of the cured coating.

As indicated above, the cured compositions have reduced friability and brittleness compared to conventional compositions prepared from glycidyl methacrylate polymers which can provide improved impact resistance and chip resistance as determined by gravelometer tests. Yet, the compositions prior to curing can be ground and sieved with conventional apparatus to provide a powder coating material that can be applied with conventional powder coating devices and cured under conventional conditions.

The following Examples illustrate various aspects of the present invention. It is to be understood that the present invention is defined by the appended claims and not the specific details of the Examples.

CONTROL EXAMPLE 1

To a two gallon Parr reactor was charged 1930 grams of xylene that was stirred at 200 rpm. Air was eliminated by consecutively pressurizing and depressurizing the reactor to 60 psig with dry nitrogen four times. The mixture was heated to 139° C., after which a mixture of 450 grams of styrene, 1020 grams of methyl methacrylate, 675 grams of n-butylacrylate, 855 grams of glycidylmethacrylate, 3 grams of n-dodecylmercaptan and 134.1 grams of t-butylperoctoate was pumped into the reactor over 5 hours at 139° C. and autogenous pressure. The charging pump and lines were rinsed with 100 grams of xylene and the polymer solution was allowed to cool to 130° C. over 15 minutes. A mixture of 60 grams xylene and 15 grams t-butylperoctoate was added over two hours as the temperature fell from 130° C. to 100° C. The pump and lines were rinsed with 10 grams of xylene and the polymer solution held for 30 minutes at 100° C.

The product solution was refluidized by carefully heating in a three neck round bottom flask fitted for distillation and most of the xylene distilled at 1 atmosphere. Vacuum was then applied while bringing the temperature up to 173° C. The molten material was stirred for 45 minutes at 170–173° C. and 0.4 mmHg and then poured into an aluminum pan to give a friable resin with a melt index of 50.5 grams per 10 minutes at 125° C. under a 2160 gram load, a melt viscosity of 195 poise and an epoxy equivalent weight of 514. The epoxy equivalent weight is determined by the procedure described in *The Determination of Epoxy Groups*, B. Dobinson, W. Hofmann & B. Stark, Pergamon Press, Elmsford, N.Y. (1969). The melt viscosity was determined in accordance with ASTM D 4287 using an ICI model VR 4752 Cone & Plate Viscometer using a 0.77 inch diameter cone operating at a shear rate of 3600 sec-1. The epoxy equivalent weight was determined by the acetic acid/perchloric acid method using a Mettler Autotitrator DL25/Mettler 20 ml Buret DV920.

EXAMPLE 1

The procedure of Control Example 1 was repeated except that 150 grams of a polyamide available from Elf Atochem under the designation Pebax 2533 was charged to the reactor with the xylene, the monomers were added to the reactor after the polyamide was dissolved in the xylene and the amount of t-butylperoctoate was increased to 144 grams. The product solution formed a clear, solid gel on cooling to room temperature. After devolatilization, a high gloss, clear, colorless resin was obtained having improved toughness compared to the same polymer without the polyamide. This graft copolymer product had an epoxy equivalent weight of 540 as determined by the acetic acid/perchloric acid method and a melt viscosity of 380 poise at 150° C. using the same apparatus and technique described in Control Example 1. The product showed a broad glass transition with a midpoint of 43° C. as determined with a Perkin Elmer DSC-7 differential scanning calorimeter.

EXAMPLE 2

The process of Example 1 was repeated except that the amount of Pebax 2533 charged to the reactor was increased to 300 grams. The discharged resin showed two clear liquid phases at 100° C. and formed localized areas of solid gel as the solution cooled. After devolatilization, the resin exhibited a melt index of 10.5 grams per 10 minutes at 125° C. under a 2160 gram load, an epoxy equivalent weight of 554 and a melt viscosity of >500 poise at 150° C. This resin was noticeably tougher and less friable than the same resin made without the polyamide in accordance with Control Example 1.

CONTROL EXAMPLE 2

To a two gallon Parr reactor equipped with a stirrer, thermostatic temperature control and a monomer addition pump was charged 1930 grams of xylene. The reactor was successively pressurized and depressurized four times with dry nitrogen to 60 psig to eliminate oxygen. A mixture of 600 grams of styrene, 1080 grams of methyl methacrylate, 120 grams of n-butylmethacrylate, 1200 grams of glycidylmethacrylate and 180 grams of t-butylperoctoate was charged over 5 hours at a temperature of 139° C. at an autogenous pressure with stirring at 200 rpm. The charging pump and lines were rinsed with 100 grams of xylene after which the stirred mixture was allowed to cool over 15 minutes to 130° C. A mixture of 60 grams of xylene and 15 grams of t-butylperoctoate was added over approximately two hours until the temperature fell from 130° C. to 100° C. The charging pump was rinsed with 10 grams of xylene and the mixture stirred for 30 minutes at 100° C. and then discharged to form a clear fluid solution when cooled to room temperature.

The mass was refluidized by heating and stirring while distilling xylene in a three neck round bottom flask at atmospheric pressure. When the amount of xylene distillate fell off, vacuum was applied and increased to 0.4 mmHg while increasing temperature to 160° C. The stirring mixture was held at 160–167° C. for 45 minutes and 0.4 mmHg after which the molten material was poured into an aluminum tray to give a clear, solid resin with a melt index of 66 grams per 10 minutes at 125° C. and a load of 2160 grams, a melt viscosity of 160 poise at 150° C. and an epoxy equivalent weight of 374.

EXAMPLE 3

The procedure of Control Example 2 was repeated except that 150 grams of Pebax 2533 was charged to the reactor with the xylene. When poured into the aluminum tray, an optically clear, solid resin was obtained with high gloss and improved toughness and reduced friability compared to the same polymer made without the polyamide.

The obtained graft copolymer exhibited a melt index of 28 grams per 10 min at 125° C. under a load of 2160 grams, a melt viscosity of 380 poise (150° C., ICI Cone & Plate Viscometer), an epoxy equivalent weight of 386 (by the glacial acetic acid/perchloric acid method) and a glass transition temperature of 48.3° C. (midpoint).

EXAMPLE 4

The procedure of Example 1 was repeated except that 1830 grams of xylene was charged to the reactor with the Pebax 2533 and the mixture subsequently added to the reactor contained 750 grams of styrene, 1230 grams of methylmethacrylate, 360 grams of n-butylacrylate, 660 grams of glycidylmethacrylate and 150 grams of t-butylperoctoate.

The resulting slightly hazy solution formed a stiff gel after cooling to room temperature. The refluidized solution was devolatilized at a maximum temperature of 166° C. and 0.4 mmHg. The substantially clear, toughened graft copolymer exhibited a melt index of 44.5 grams per 10 minutes at 125° C. with a 2160 gram load, a melt viscosity of 293 poise at 150° C. and an epoxy equivalent weight of 747.

EXAMPLE 5

A clear coating composition was prepared with 162.0 grams of the graft copolymer of Example 1, 33.2 grams of 1,12-dodecanedioic acid, 0.98 grams of benzoin, 4.5 grams of Modaflow Powder III, 3.9 grams of Tinuvin 900 and 2.0 grams of Tinuvin 144. After premixing in a high speed food blender, this composition was melt mixed at 70° C. and 300 rpm. The cooled extrudate was ground and sieved to 140 mesh and electrostatically sprayed onto 4×12 inch zinc phosphated steel panels and cured for 30 minutes at 182° C.

The resulting clear coating, having an applied thickness of 2.4 to 2.7 mil exhibited the following coating properties: gloss (20 deg/60 deg.) according to ASTM/D523=88/98; clarity=excellent; smoothness (PCI)=9 (wherein 1=least smooth and 10=smoothest); distinctness of image (DOI) according to GM91013=70; pencil hardness according to ASTM D3365=H; crosshatch adhesion according to ASTM 3359=100 (no loss); 100 MEK rubs=slightly marring; Gardner impact (in-lbs, direct/reverse) according to ASTM D2794=45/<5; ⅛ inch mandrel bend according to ASTM D522=pass.

EXAMPLE 6

A clear coating composition was prepared with 400 grams of the graft copolymer of Example 2, 83 grams of 1,12-dodecanedioic acid, 11.2 grams of Modaflow Powder III, 9.7 grams of Tinuvin 900 and 4.8 grams of Tinuvin 144. This composition was thoroughly premixed in a high speed food blender followed by melt mixing as above at 70° C. and 300 rpm. The cooled extrudate was ground and sieved to 140 mesh and electrostatically applied to 4×12 inch phosphated steel panels to obtain 2.8 to 3.3 mil thick coatings after baking 30 minutes at 163° C.

A clear coating composition using the copolymer of Control Example 1 was made as above, but with the following proportions: control copolymer=614.2 grams, 1,12-dodecanedioic acid=135.8 grams, benzoin=3.7 grams, Modaflow Powder III=11.5 grams, Tinuvin 900=11.2 grams, Tinuvin 144=7.5 grams. As above, 2.8–3.3 mil coatings cured for 30 minutes at 163° C. on zinc phosphated steel panels were prepared. Coating results are summarized in Table I below. The tests are in accordance with those described in Example 5.

TABLE I

| Tests Performed | Control Coating (no polyamide) | Coating (Graft Copolymer with Polyamide) |
| --- | --- | --- |
| Melt viscosity of resins | 195 poise (150° C.) | >500 poise (150° C.) |
| Gloss (20/60 degree) | 94/102 | 92/102 |
| Clarity | Excellent | Excellent |
| Smoothness (PCI) | 8+ | 8+ |
| Distinctness of Image | 90 | 50 |
| Crosshatch adhesion | 100 (no loss) | 100 (no loss) |
| Pencil hardness | H— | HB |
| 100 MEK rubs | Slight mar | Moderate mar |
| Gardner impact (inch-lbs, direct/reverse) | 30/<5 | 110/70 |
| Mandrel bend | Pass 1/8 inch | Pass 1/8 inch |
| QUV % retention of gloss | 89/92 (1845 hrs exposure) | 89/94 (2000 hrs exposure) |

The comparison shows that a graft copolymer in accordance with the present invention improves mechanical properties with little or no change in clarity or appearance of the clear coating, in spite of the much higher melt viscosity of the graft copolymer relative to a copolymer prepared without the polyamide.

EXAMPLE 7

A clear coating composition was prepared using 400 grams of the graft copolymer of Example 3, 119.2 grams of 1,12-dodecanedioic acid, 2.6 grams of benzoin, 12.0 grams of Modaflow Powder III, 10.4 grams of Tinuvin 900 and 5.2 grams of Tinuvin 144. These ingredients were premixed in a high speed food mixer and melt mixed as above at 100° C. and 300 rpm. The cooled extrudate was ground to a fine powder in the food blender and sieved to 140 mesh. Clear coatings of 2.9 to 3.3 mil were obtained by electrostatic spraying onto zinc phosphated steel test panels and baking for 30 minutes at 163° C.

For comparison purposes, a coating was prepared using 400 grams of the copolymer of Control Example 2, 123 grams of 1,12-dodecanedioic acid, 2.6 grams of benzoin, 12.1 grams of Modaflow Powder III, 10.5 grams of Tinuvin 900 and 5.2 grams of Tinuvin 144. A powder coating was prepared using the same procedure as for the graft copolymer. Coating test results are shown in Table II.

TABLE II

| Tests Performed | Control Coating (No Polyamide) | Coating (Graft Copolymer with Polyamide) |
| --- | --- | --- |
| Melt Viscosity of resins | 160 poise (150° C.) | 386 poise (150° C.) |
| Gloss (20/60 degree) | 73/86 | 86/96 |
| Clarity | Excellent | Excellent |
| Smoothness (PCI) | 9 | 9 |
| Distinctness of image | 70 | 60 |
| Crosshatch adhesion | 100 (no loss) | 100 (no loss) |
| Pencil hardness | 2H | H- |
| 100 MEK rubs | Slight mar | Slight mar |
| Gardner impact (inch-lbs, direct/reverse) | 25/<5 | 50/10 |
| Mandrel Bend | Pass 1/8 inch | Pass 1/8 inch |
| QUV (1500 hrs, UVB) | No change in gloss | No change in gloss |

The comparison illustrates that a coating made with a graft copolymer in accordance with the present invention has improved mechanical properties with at least the same appearance and optical clarity relative to a copolymer prepared without the polyamide in spite of having a much higher melt viscosity.

EXAMPLE 8

A clear coating composition was prepared from 439.9 grams of the resin of Example 4, 50.8 grams of 1,12-dodecanedioic acid, 9.3 grams of 1,3,4-butanetricarboxylic acid, 5.0 grams of Uraflow B, 7.5 grams of Tinuvin 900, 5.0 grams of Tinuvin 144, and 11.5 grams of Modaflow Powder III. The above mixture was thoroughly premixed in a high speed food type blender followed by melt mixing in an APV 19 mm twin screw extruder operating at 95° C. and 300 rpm. The extrudate was cooled and ground to a fine powder in the high speed blender. The resulting powder was sieved to 140 mesh and applied to 4×12 inch, zinc phosphated steel panels with a Gema-Volstatic electrostatic spray gun to obtain 2.9 to 3.3 mil thick cured coating after baking 30 minutes at 182° C. in a circulating air, electric oven.

The clear, colorless coating was tested with the following results in accordance with tests described previously: gloss (20 deg/60 deg)=89/100; PCI smoothness=8; distinctness of image (DOI)=50; pencil hardness=F; Gardner impact=40/5 (in-lbs, direct/reverse); and ⅛" mandrel bend=pass. In addition, the coating is substantially resistant to 100 double solvent (methylethylketone) rubs.

After 1500 hours exposure in a QUV cabinet (Q-Panel Co., Cleveland, Ohio, with UVB lamps operating at 59% of maximum output), the coating showed 90% and 93% retention of the 20 and 60 degree glosses, respectively. After 2000 hours exposure, the gloss values were 40% and 65% of the original.

Although the present invention has been described with reference to certain preferred embodiments, it is apparent that modifications and variations thereof may be made by those skilled in the art without departing from the scope of the invention as defined by the following claims.

What is claimed is:

1. A graft copolymer comprising a polyamide to which is grafted a glycidyl group-containing acrylate copolymer wherein said graft copolymer is optically transparent and said polyamide is present in an amount of from about 2 to about 50% by weight of the graft copolymer.

2. The graft copolymer of claim 1 wherein the polyamide has a melting point of less than about 160° C.

3. The graft copolymer of claim 1 wherein the polyamide has a melting point of less than about 145° C.

4. The graft copolymer of claim 1 wherein the polyamide is a block copolymer of polydodecanolactam and polytetramethylene ether glycol.

5. The graft copolymer of claim 1 wherein the graft copolymer comprises from about 5 to about 20% by weight of the polyamide.

6. The graft copolymer of claim 1 wherein the glycidyl group-containing acrylate copolymer is derived from at least one compound of formula (I) and at least one ethylenically unsaturated compound copolymerizable therewith wherein formula (I) is as follows:

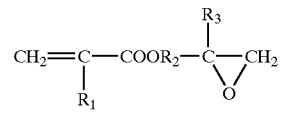

wherein $R_1$ represents H or an alkyl group containing from 1 to 4 carbon atoms, $R_2$ represents a branched or unbranched alkyl group containing from 1 to 20 carbon atoms, and $R_3$ represents H or an alkyl group containing from 1 to 4 carbon atoms.

7. The graft copolymer of claim 6 wherein the compound of formula (I) is selected from the group consisting of glycidyl acrylate, glycidyl methacrylate, 1,2-epoxybutylacrylate, and betamethyl glycidyl methacrylate.

8. The graft copolymer of claim 6 wherein the glycidyl group-containing acrylate copolymer is comprised of from about 10 to about 70% by weight of the compound of formula (I).

9. The graft copolymer of claim 6 wherein the ethylenically unsaturated compound comprises an alkyl ester of acrylic acid or methacrylic acid.

10. The graft copolymer of claim 9 wherein the ethylenically unsaturated compound comprises a mixture of methyl methacrylate and n-butyl methacrylate.

11. The graft copolymer of claim 9 wherein the ethylenically unsaturated compound further comprises styrene.

12. The graft copolymer of claim 6 wherein the glycidyl group-containing acrylate copolymer is comprised of from about 30 to about 90% by weight of the ethylenically unsaturated compound.

13. The graft copolymer of claim 6 wherein the glycidyl group-containing acrylate copolymer is comprised of glycidyl methacrylate, methyl methacrylate, n-butyl methacrylate and styrene.

14. The graft copolymer of claim 1 wherein the graft copolymer comprises from about 50 to about 98% by weight of the glycidyl group-containing acrylate copolymer.

15. The graft copolymer of claim 1 wherein the graft copolymer comprises from about 80 to about 95% by weight of the glycidyl group-containing acrylate copolymer.

16. A process for preparing a graft copolymer comprising a polyamide to which is grafted a glycidyl group-containing acrylate copolymer, said process comprising:
A) dispersing in an organic solvent a polyamide and a material which will react with the polyamide to form the graft copolymer of the polyamide and the glycidyl group-containing acrylate copolymer; and
B) polymerizing the polyamide and the material so as to form said graft copolymer wherein said graft copolymer is optically transparent and said polyamide is present in an amount of from about 2 to about 50% by weight of the graft copolymer.

17. The process of claim 16 wherein the polyamide has a melting point of less than about 160° C.

18. The process of claim 16 wherein the polyamide has a melting point of less than about 145° C.

19. The process of claim 16 wherein the polyamide is a block copolymer of polydodecanolactam and polytetramethylene ether glycol.

20. The process of claim 16 wherein the polyamide is a block copolymer of polydodecanolactam and polyethylene ether glycol.

21. The process of claim 16 wherein the polyamide is a block copolymer of polydodecanolactam and polypropylene ether glycol.

22. The process of claim 16 wherein the graft copolymer comprises from about 2 to about 50% by weight of the polyamide.

23. The process of claim 16 wherein the graft copolymer comprises from about 5 to about 20% by weight of the polyamide.

24. The process of claim 16 wherein the material comprises at least one compound of formula (I) and at least one ethylenically unsaturated compound copolymerizable therewith wherein formula (I) is as follows:

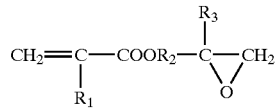

wherein $R_1$ represents H or an alkyl group containing from 1 to 4 carbon atoms, $R_2$ represents a branched or unbranched alkyl group containing from 1 to 20 carbon atoms, and $R_3$ represents H or an alkyl group containing from 1 to 4 carbon atoms.

25. The process of claim 24 wherein the compound of formula (I) is selected from the group consisting of glycidyl acrylate, glycidyl methacrylate, 1,2-epoxybutylacrylate, and betamethyl glycidyl methacrylate.

26. The process of claim 24 wherein the glycidyl group-containing acrylate copolymer is comprised of from about 10 to about 70% by weight of the compound of formula (I).

27. The process of claim 24 wherein the ethylenically unsaturated compound comprises an alkyl ester of acrylic acid or methacrylic acid.

28. The process of claim 27 wherein the ethylenically unsaturated compound comprises a mixture of methyl methacrylate and n-butyl methacrylate.

29. The process of claim 27 wherein the ethylenically unsaturated compound further comprises styrene.

30. The process of claim 24 wherein the glycidyl group-containing acrylate copolymer is comprised of from about 30 to about 90% by weight of the ethylenically unsaturated compound.

31. The process of claim 24 wherein the glycidyl group-containing acrylate copolymer is comprised of glycidyl methacrylate, methyl methacrylate, n-butyl methacrylate and styrene.

32. The process of claim 16 wherein the graft copolymer comprises from about 50 to about 98% by weight of the glycidyl group-containing acrylate copolymer.

33. The process of claim 16 wherein the graft copolymer comprises from about 80 to about 95% by weight of the glycidyl group-containing acrylate copolymer.

34. The process of claim 16 wherein the organic solvent is a non-polar aromatic solvent.

35. The process of claim 34 wherein the organic solvent is xylene.

36. The process of claim 16 wherein the reaction is conducted in the presence of a free radical initiator.

37. The process of claim 36 wherein the free radical initiator is selected from the group consisting of t-butyl peroctoate and di-t-amyl peroxide.

38. A graft copolymer comprising a polyamide to which is grafted a glycidyl group-containing acrylate copolymer wherein the glycidyl group-containing acrylate copolymer is derived from at least one compound of formula (I) and a mixture of methyl methacrylate and n-butyl methacrylate wherein formula (I) is as follows:

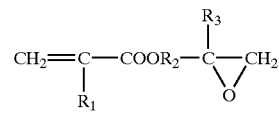

wherein $R_1$ represents H or an alkyl group containing from 1 to 4 carbon atoms and $R_2$ represents a branched or unbranched alkyl group containing from 1 to 20 carbon atoms.

39. The graft copolymer of claim 38 wherein the ethylenically unsaturated compound further comprises styrene.

40. The graft copolymer of claim 39 wherein the glycidyl group-containing acrylate copolymer is comprised of glycidyl methacrylate, methyl methacrylate, n-butyl methacrylate and styrene.

* * * * *